(12) United States Patent
Chen et al.

(10) Patent No.: US 9,307,228 B2
(45) Date of Patent: Apr. 5, 2016

(54) DEPTH OF FIELD MAINTAINING APPARATUS, 3D DISPLAY SYSTEM AND DISPLAY METHOD

(71) Applicant: BOE Technology Group Co., Ltd., Beijing (CN)

(72) Inventors: Yanshun Chen, Beijing (CN); Youmei Dong, Beijing (CN); Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 280 days.

(21) Appl. No.: 13/985,020

(22) PCT Filed: Nov. 19, 2012

(86) PCT No.: PCT/CN2012/084852
§ 371 (c)(1),
(2) Date: Aug. 12, 2013

(87) PCT Pub. No.: WO2014/000370
PCT Pub. Date: Jan. 3, 2014

(65) Prior Publication Data
US 2014/0055580 A1 Feb. 27, 2014

(51) Int. Cl.
*H04N 13/00* (2006.01)
*H04N 13/04* (2006.01)
(52) U.S. Cl.
CPC ........... *H04N 13/04* (2013.01); *H04N 13/0022* (2013.01); *H04N 13/0475* (2013.01)
(58) Field of Classification Search
CPC ..................... H04N 13/04; H04N 13/0022
USPC .......................................................... 348/54
See application file for complete search history.

(56) References Cited

U.S. PATENT DOCUMENTS

2002/0141635 A1* 10/2002 Swift et al. ............... 382/154
2005/0089212 A1* 4/2005 Mashitani et al. ......... 382/154
(Continued)

FOREIGN PATENT DOCUMENTS

CN 1643939 A 7/2005
CN 102075776 A 5/2011
(Continued)

OTHER PUBLICATIONS

International Search Report (Chinese language) issued by the International Searching Authority, rendered Jun. 26, 2012, 12 pages.
(Continued)

*Primary Examiner* — Sath V Perungavoor
*Assistant Examiner* — Jeffery Williams
(74) *Attorney, Agent, or Firm* — Ladas & Parry LLP

(57) ABSTRACT

Embodiments of the present invention disclose a depth of field maintaining apparatus, a 3D display system and a display method. The depth of field maintaining apparatus comprises: a 3D video signal input device; a position measuring device; an image processing device; and a 3D video signal output device, wherein the 3D video signal input device, the position measuring device and the 3D video signal output device are connected to the image processing device, the 3D video signal input device transmits an acquired 3D video signal to the image processing device, the position measuring device transmits detected position information of the viewer and the display screen to the image processing device, and the image processing device adjusts a space between corresponding object points in left and right eye images in a 3D video signal in accordance with the position information, such that a depth of field remains unchanged, and transmits a adjusted 3D video signal to the 3D video signal output device.

15 Claims, 4 Drawing Sheets

(56) References Cited

U.S. PATENT DOCUMENTS

| 2010/0201790 | A1* | 8/2010 | Son et al. ................ 348/53 |
| 2011/0254925 | A1 | 10/2011 | Ushiki et al. |
| 2011/0292190 | A1* | 12/2011 | Kim et al. ................ 348/54 |
| 2012/0120064 | A1 | 5/2012 | Noda et al. |

FOREIGN PATENT DOCUMENTS

| CN | 102158721 A | 8/2011 |
| CN | 102193705 A | 9/2011 |
| CN | 102223550 A | 10/2011 |
| CN | 102316333 A | 1/2012 |
| CN | 102340678 A | 2/2012 |
| CN | 102752621 A | 10/2012 |

OTHER PUBLICATIONS

The State Intellectual Property Office of the People's Republic of China ("SIPO") (Chinese Language) Office Action issued on Dec. 31, 2013 by SIPO in Chinese Patent Application No. 201210216350. 2; six (6) pages.
English Translation of the State Intellectual Property Office of the People's Republic of China ("SIPO") Office Action issued on Dec. 31, 2013 by SIPO in Chinese Patent Application No. 201210216350. 2; eight (8) pages.
Espacenet Bibliographic Data, Abstract of CN102075776(A) listed above, 1 page.
English Translation of CN102223550(A) listed above, 51 pages.
English Translation of CN102158721(A) listed above, 20 pages.
English Translation of CN102316333(A) listed above, 20 pages.
English Translation of CN102340678(A) listed above, 24 pages.
English Translation of CN102193705(A) listed above, 13 pages.
English Translation of CN102752621(A) listed above, 18 pages.
International Preliminary Report on Patentability for International Application No. PCT/CN2012/084852 dated Dec. 31, 2014, ten (10) pages.
Rejection Decision for Chinese Patent Application No. 201210216350.2 dated Dec. 15, 2014; nine (9) pages.
English translation of Rejection Decision for Chinese Patent Application No. 201210216350.2 dated Dec. 15, 2014; twelve (12) pages.
Second Office Action issued by the Chinese Patent Office for Chinese Patent Application No. 2012102163502, 8pgs.
English translation of Second Office Action issued by the Chinese Patent Office for Chinese Patent Application No. 2012102163502, 9pgs.
Third Office Action issued by the Chinese Patent Office for Chinese Patent Application No. 2012102163502 dated Aug. 26, 2014, 8pgs.
English translation of Third Office Action issued by the Chinese Patent Office for Chinese Patent Application No. 2012102163502 dated Aug. 26, 2014, 8pgs.

\* cited by examiner

DEPTH OF FIELD MAINTAINING APPARATUS, 3D DISPLAY SYSTEM AND DISPLAY METHOD

CROSS REFERENCE TO RELATED APPLICATIONS

This application is based on International Application No. PCT/CN2012/084852 filed on Nov. 19, 2012, which claims priority to Chinese National Application No. 201210216350.2, filed on Jun. 26, 2012, the contents of which are incorporated herein by reference.

BACKGROUND

Embodiments of the present invention relate to a depth of field maintaining apparatus, a three-dimensional (3D) display system and a display method.

Three-dimensional display has been one mainstream trend in the display field. The basic principle of the current three-dimensional display lies in: the stereoscopic vision is resulted from the parallax, i.e. a left eye of a viewer only sees a left eye image and a right eye only sees a right eye image, wherein the left eye image and the right eye image are a pair of stereoscopic images with parallax. The human brain will fuse the two images, and thus the 3D effect is produced.

A method for determining a depth of field of a displayed content by the human eyes is illustrated in FIG. 1. Two circles with a space of S at a position where a viewer is located, represent the left and right eyes of the viewer, respectively, wherein S is the pupil distance. Two squares at a position where a display screen is located represent the left and right eye images of a certain object, which are seen by the right and left eyes of the viewer, respectively. By this stereoscopic imaging, the brain of the viewer then thinks that this object is actually located at a position with a distance L from the screen plane. The distance L is the depth of field (DOF) and D is a viewing distance of the viewer. The following formula can be easily obtained according to FIG. 1.

$$\frac{M}{S} = \frac{L}{D-L}$$

In a current 3D display, an space between a pair of stereoscopic images on the display screen is invariable for one picture, that is to say, M is invariable. Consequently, as a position of the viewer changes, that is to say, D varies, the depth of field may changes, that is to say, and L varies as D varies. As shown in FIG. 2 (wherein a left figure shows a case before the viewing distance changes and the right figure shows a case after the viewing distance changes), S, which is the pupil distance, remains unchanged. As M is unchanged and the viewing distance of the viewer changes from D to D", the DOF becomes from L to L". In fact, in order to simulate more realistic picture, it is desired that the DOF is invariable.

SUMMARY

Embodiment of the present invention provide a DOF maintaining apparatus, a 3D display system and a display method capable of keeping the DOF of a 3D picture seen by a viewer unchanged with the movement of the viewer.

In one aspect, an embodiment of the present invention provides a DOF maintaining apparatus comprising: a 3D video signal input device; a position measuring device; an image processing device; and a 3D video signal output device, wherein the 3D video signal input device, the position measuring device and the 3D video signal output device are connected to the image processing device, the 3D video signal input device transmits an acquired 3D video signal to the image processing device, the position measuring device transmits detected position information of the viewer and the display screen to the image processing device, and the image processing device adjusts a space between corresponding object points in left and right eye images in a 3D video signal in accordance with the position information, such that a depth of field remains unchanged, and transmits a adjusted 3D video signal to the 3D video signal output device.

Alternatively, the image processing device comprises: a left and right eye image adjustment module, adjusting the space between the corresponding object points in the left and right eye images of the 3D video signal in accordance with the position information so as to keep the depth of field unchanged for the same viewer, and transmits adjusted left and right eye images to a 3D video signal generating module; and the 3D video signal generating module, generating a new 3D video signal in accordance with the adjusted left and right eye images and transmits the new 3D video signal to the 3D video signal output device.

Alternatively, the image processing device further comprises: a left and right eye image extracting module, which receives the 3D video signal and sends the left and right eye images extracted from the 3D video signal to the left and right eye image adjustment module.

Alternatively, the left and right eye image extracting module comprises: a sampling sub-module, capturing one frame data of the 3D video signal and sending the one frame data to a separating sub-module; and the separating sub-module, transmitting the left and right eye images separated from the one frame data to the left and right eye image adjustment module.

Alternatively, the DOF maintaining apparatus, further comprises: a depth of field acquisition device and a depth of field memory, wherein the depth of field acquisition device is connected to the position measuring device, the image processing device and the depth of field memory, and the depth of field memory is connected to the image processing device, and the depth of field acquisition device receives an original position information of the viewer detected by the position measuring device and receives an original space between corresponding object points in the left and right eye images in the 3D video signal sent by the image processing device, and calculates the depth of field and sends the depth of field to the depth of field memory to store.

Alternatively, the DOF maintaining apparatus, further comprises a depth of field acquisition device and a depth of field memory, wherein the depth of field acquisition device is connected to the depth of field memory, and sends a received original depth of field value to the depth of field memory, and the depth of field memory is connected to the image processing device.

Alternatively, the position measuring device comprises a camera, an infrared sensor or a device a device by which a position information is manually inputted.

An embodiment of the present invention further provides a 3D display system comprising: a display device; and a depth of field maintaining apparatus as mentioned above, the 3D video signal output device of the depth of field maintaining apparatus is connected to the display device and transmits an adjusted 3D video signal to the display device for displaying.

Alternatively, the display device comprises a Shutter Glasses 3D display device, a phase retarder 3D display device, a parallax barrier 3D display device, a lenticular grating 3D display device or a directional backlight 3D display device.

An embodiment of the present invention further provides a 3D display method performed by using the above depth of field maintaining apparatus, comprising: step S1, capturing in real time position information of a viewer and a display screen with changing of a position of the viewer and acquiring left and right eye images of a 3D video signal; step S2, calculating a space between the corresponding object points of the left and right eye images displayed on the display screen in real time in accordance with the position information, such that the depth of field remains unchanged for the same viewer; step S3, generating a new 3D video signal in accordance with calculated a space in the step S2 and the left and right eye images, and making it be displayed on the display screen.

Alternatively, in the step S1, the position information of the viewer and the display screen is captured by using a camera, an infrared sensor or a device by which the position information is manually inputted Alternatively, if the left and right eye views of the 3D video signal are transmitted in the form of one integrally picture, the acquiring left and right eye images of a 3D video signal in the step S1 comprises the following steps: capturing one frame data of the 3D video signal; separating the left and right eye images from the one frame data.

Wherein, a computing formula in the step S2 is as following:

$$M = \frac{SL}{D-L}$$

wherein M is a space between the corresponding object points of the left and right images shown on the display screen, S is a pupil distance of the viewer, D is a distance between the viewer and the display screen, and L is the depth of field.

Alternatively, before the step S1, the 3D display method further comprising: calculating the depth of field according to an original space between corresponding object points when the left and right eye images is displayed on the display screen and an original distance between the viewer and the display screen by using the following formula:

$$L = \frac{MD}{S+M}$$

wherein M is a space between the corresponding object points of the left and right images shown on the display screen, S is a pupil distance of the viewer, D is a distance between the viewer and the display screen, and L is the depth of field.

Alternatively, before the step S1, the 3D display method further comprising: acquiring an original depth of field value set by the user.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

A First Embodiment

Figure 1:
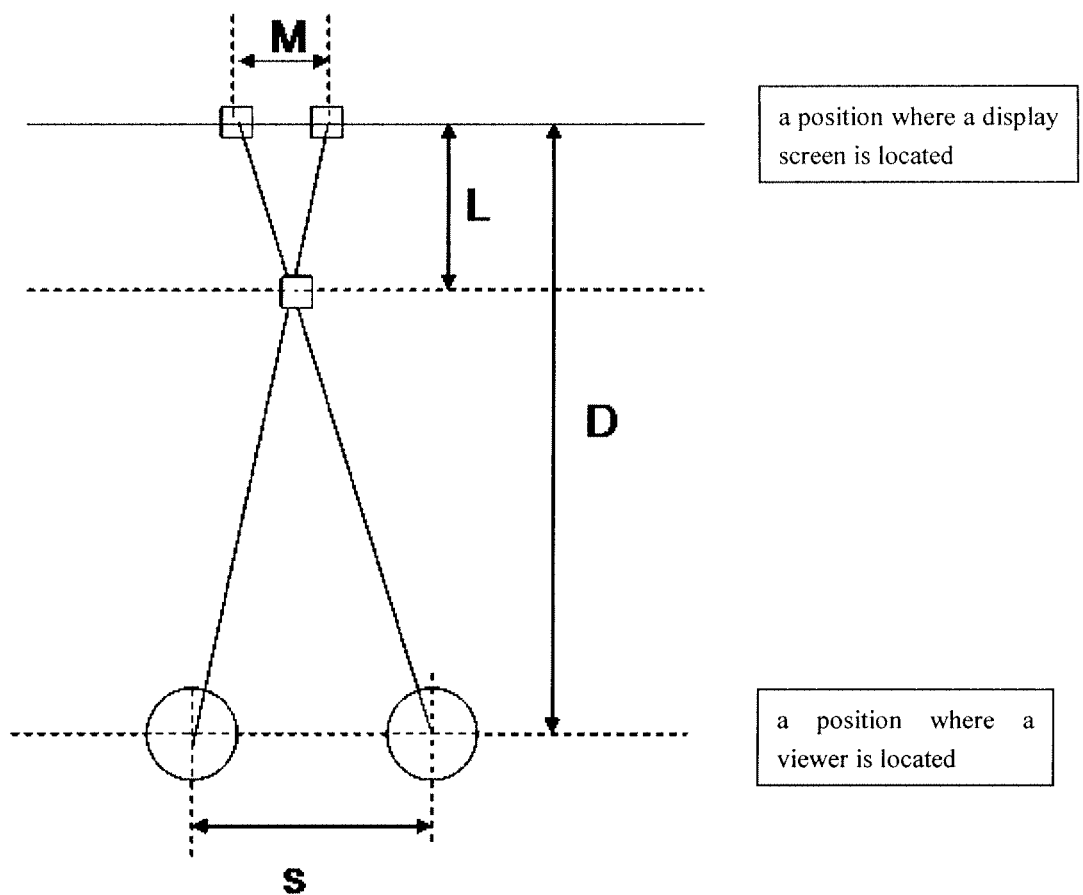
FIG. 1 is a principle view showing a viewer's perception of a 3D display.
Figure 2:
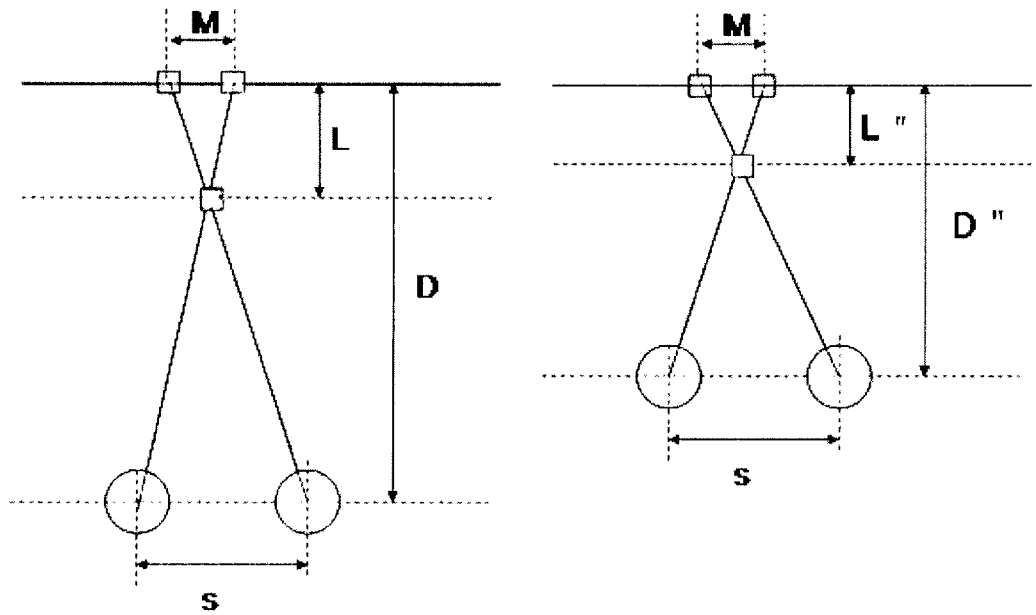
FIG. 2 is a principle view illustrating the viewer's perception of the 3D display before and after movement.
Figure 3:
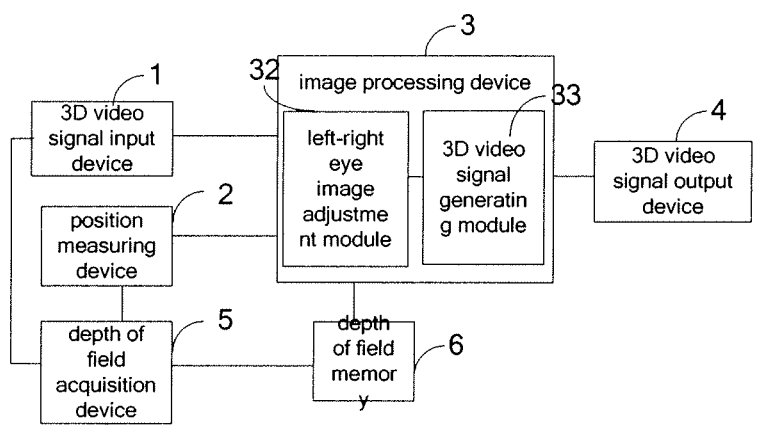
FIG. 3 is a structural diagram of a DOF maintaining apparatus according to an embodiment of the present invention.

A structure of a DOF maintaining apparatus according to a first embodiment of the present invention is shown as in FIG. 3, and the DOF maintaining apparatus comprises a 3D video signal input device 1, a position measuring device 2, an image processing device 3 and a 3D video signal output device 4. The 3D video signal input device 1, the position measuring device 2 and the 3D video signal output device 4 are all connected to the image processing device 3.

The 3D video signal input device 1, which can be any type of the transmission interface capable of transmitting a 3D video signal, transmits an obtained 3D video signal to the image processing device 3.

The position measuring device 2 transmits the detected position information of a viewer and a display screen to the image processing device 3. In the embodiment, the position measuring device 2 comprises but is not limited to a camera, an infrared sensor or a device by which a position information can be manually inputted, wherein the position information can be coordinates of the viewer and the display screen in the current space coordinate system, and also a distance between the viewer and the display screen. For example, the camera collects position coordinates of the viewer and the display screen in the space coordinate system and transmits the position coordinates to the image processing device 3, or a computation module in the camera calculates out a distance between the viewer and the display screen in accordance with the coordinates of the display screen and the viewer in the space coordinate system and transmits the distance to the image processing device 3.

The image processing device 3 adjusts a space between corresponding object points in left and right eye images of the 3D video signal in accordance with above position information so as to make the DOF remain unchanged for the same viewer, and transmits the adjusted 3D video signal to the 3D video signal output device 4. In the embodiment, the image processing device 3 can be a embedded chip system composed of a Micro Control Unit (MCU), a Field—Programmable Gate Array (FPGA) or a Permanent Linear Contactless Displacement Sensor (PLCD), etc. The 3D video signal usually comprises the left and right eye images, i.e. the left eye image and the right eye image, and an original space between the corresponding object points when both of them are displayed. The image processing device 3 concretely comprises a left and right eye image adjustment module 32 and a 3D video signal generating module 33.

The left and right eye image adjustment module 32 adjusts the space between the corresponding object points in the left and right eye images of the 3D video signal in accordance with the above position information so as to keep the DOF unchanged, and transmits the adjusted left and right eye images to the 3D video signal generating module 33. If the position information is a position coordinates of the viewer, this module firstly calculates a distance between the viewer and the display screen in accordance with the coordinates of the display screen in the spatial coordinate system and this position coordinates. The space M between the corresponding object points in the left and right eye images of the 3D video signal is adjusted with the following equation:

$$M = \frac{SL}{D-L}$$

where S is the pupil distance and remains unchanged, L is the DOF, which also remains unchanged, D is a distance between the viewer and the display screen, and thus M is calculated according to the above equation as D varies.

The left and right eye images are adjusted in accordance with the value M after obtaining the value M, and the adjusted left and right eye images are transmitted to the 3D video signal generating module 33, which generates a new 3D video signal in accordance with the adjusted left and right eye images.

Figure 4:
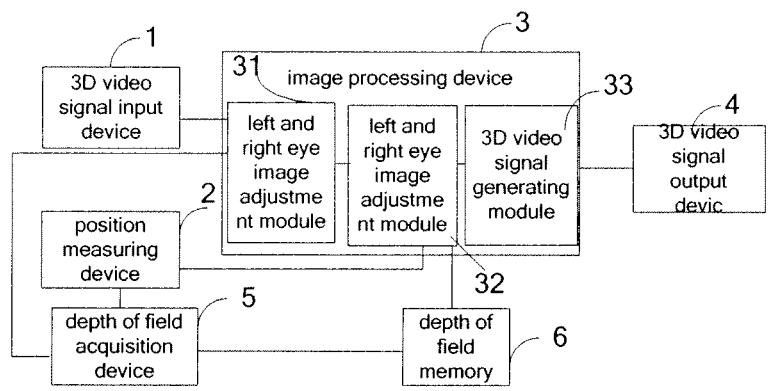
FIG. 4 is a structural diagram of another DOF maintaining apparatus according to an embodiment of the present invention.

As the left eye image and right eye image of the current some 3D video signals may be transmitted as the same one picture, it is necessary to separate the left eye image and the right eye image away from this one picture. Consequently, the DOF maintaining apparatus according to the present embodiment further comprises a left and right eye image extracting module 31. As shown in FIG. 4, the left and right eye image extracting module 31 receives a 3D video signal inputted by the 3D video signal input device, and transmits the left and right eye images extracted from the 3D video signal to the left and right eye image adjustment module 32. The left and right eye image extracting module 31 comprises a sampling sub-module and a separating sub-module, wherein the sampling sub-module is used for collecting one frame data of the 3D video signal and sending the frame data to the separating sub-module, and the separating sub-module is used for transmitting the left and right eye images separated away from the one frame data to the left and right eye image adjustment module 32.

The pupil distance S and the DOF L are predetermined values which are obtained in advance and stored in a memory constituting a chip system of the image processing device 3. A user needs to obtain an original value of the DOF L when watching for the first time. At the same time, in order to ensure that L can not be displaced by other data in the memory, the DOF maintaining apparatus further includes a DOF acquisition device 5 and DOF memory 6, wherein the DOF acquisition device 5 is connected to the DOF memory 6 and sends the obtained original DOF value into the DOF memory 6 for storing, the DOF memory 6 is connected to the left and right eye image adjustment module 32 which acquires the original DOF from the DOF memory 6.

Exemplarily, the DOF acquisition device 5 obtains the original DOF by using the following two manners.

1. The DOF acquisition device 5 is a module having computational function. As shown in FIGS. 3 and 4, the DOF acquisition device 5 is connected to the position measuring device 2 and connected to the 3D video signal input device 1 or the left and right eye image extracting module 31. If the left and right eye images of the 3D video signal are transmitted in a form of one integrally picture, the DOF acquisition device 5 is connected to the left and right eye image extracting module 31 and acquires the original space between the corresponding object points in the left and right eye images of the 3D video signal from the latter. The original space M between the corresponding object points in the left and right eye images of the 3D video signal and the original position information D of the viewer detected by the position measuring device 2 are received by the DOF acquisition device 5, and then the original DOF is calculated according to the following equation and sent to the DOF memory to store.

$$L = \frac{MD}{S+M}$$

Figure 5:
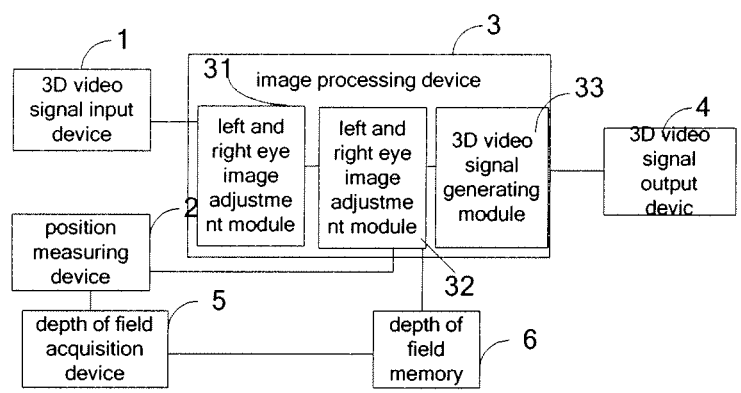
FIG. 5 is a structural diagram of still another DOF maintaining apparatus according to an embodiment of the present invention.

2. The DOF acquisition device 5 is an input device, for example, a keyboard. As shown in FIG. 5, the DOF acquisition device 5 is connected to the DOF memory 6 and sends the received original DOF value inputted by the user into the latter to store. This input-type DOF acquisition device 5 facilitates the user to input suitable DOF for viewing with a good user experience.

The DOF maintaining apparatus according to an embodiment of the present invention can adjust in real time the space M between the corresponding object points in the left and right eye images on the display screen when the viewer moves, such that the DOF remains unchanged and a better viewing effect is achieved.

A Second Embodiment

Figure 6:
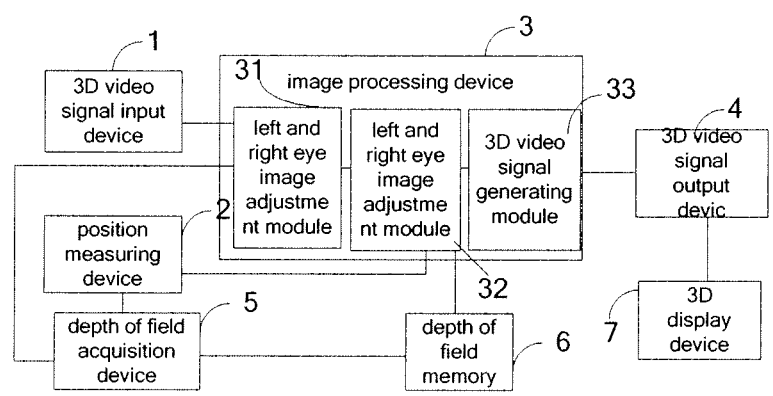
FIG. 6 is a structural diagram of a 3D display system according to an embodiment of the present invention.

As shown in FIG. 6, the second embodiment of the present invention provides a 3D display system comprising a 3D display device 7 and the DOF maintaining apparatus according to the first embodiment. The 3D video signal generating module 33 of the DOF maintaining apparatus transmits a new generated 3D video signal through the 3D video signal output device 4 to the 3D display device 7 for displaying, in order to ensure that the DOF remains unchanged during displaying of the 3D display device 7. Herein, the 3D display device 7 comprises a Shutter Glasses 3D display device, a phase retarder 3D (also called no flashing 3D) display device, a parallax barrier 3D display device, a lenticular grating 3D display device or a directional backlight 3D display device.

As examples, the 3D display device 7 comprises a display panel and a phase retarder plate, a parallax barrier, a lenticular grating, etc. The display panel, by way of example, can be a liquid display panel, an organic electroluminescent display panel, a plasma display panel or an electronic ink display panel, etc.

A Third Embodiment

The third embodiment of the present invention provides a 3D display method comprising:

step S701, capturing in real time position information of a viewer and a display screen real-timely with changing of the position of the viewer and acquiring left and right eye images of a 3D video signal. More specifically, the position information of the viewer and the display screen is captured in real time by using a position measuring device, such as, a camera, an infrared sensor or a device by which the position information can be manually inputted, etc. The position information can be coordinates of the viewer and the display screen in the current space coordinate system, or a distance between the viewer and the display screen, for example, the coordinates of the viewer and the display screen in the current space coordinate system is captured by the camera, or the distance between the viewer and the display screen is calculated by a computational module in the camera in accordance with the coordinates of the display screen in the space coordinate system and this position coordinates. The 3D video signal usually comprises left and right eye images, i.e. the left eye image and the right eye image, and an original space between corresponding object points when both of the views are displayed. If the left and right eye images of the 3D video signal are transmitted in form of one integrally picture, one frame data of the 3D video signal is captured, and the left and right eye images are separated from the frame data.

step S702, calculating the space between the corresponding object points of the left and right eye images displayed on the display screen in real time in accordance with the position information and the DOF information, such that the DOF remains unchanged for the same viewer. That is to say, the space between the corresponding object points of the left and right eye images displayed on the display screen is calculated with the following equation according to the distance between the viewer and the display screen after the movement of the viewer:

$$M = \frac{SL}{D-L}$$

wherein M is the space between the corresponding object points of the left and right eye images displayed on the display screen, S is the pupil distance, D is the distance between the viewer and the display screen, and L is the depth of field.

step S703, generating a new 3D video signal in accordance with the calculated space and the left and right eye images, and making it be displayed on the display screen.

If the viewer watches the screen for the first time, before the step S701, the method further comprises: calculating the DOF according to the original space between the corresponding object points when the left and right eye images is displayed on the display screen and the original distance between the viewer and the display screen by using the following formula:

$$L = \frac{MD}{S+M}$$

Alternatively, the original DOF also can be determined in accordance with the original DOF set by the user before the step S701.

In the method according to the embodiment of the present invention, the space M between the corresponding object points of the left and right eye images on the display screen can be adjusted in real time when the viewer moves, such that the DOF remains unchanged and thereby, a better viewing effect is achieved.

It should be understood for those skilled in the art that the whole or partial steps in the method of the above embodiment can be achieved by relative hardware after the instruction of a program, and the program may be stored in a computer-readable storage medium, for example, ROM/RAM, disk, CD, etc.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The invention claimed is:

1. A depth of field maintaining apparatus, comprising:
   a 3D video signal input device;
   a position measuring device;
   an image processing device; and
   a 3D video signal output device,
   wherein the 3D video signal input device, the position measuring device and the 3D video signal output device are connected to the image processing device,
   the 3D video signal input device transmits an acquired 3D video signal to the image processing device,
   the position measuring device transmits detected position information of a viewer and a display screen to the image processing device, and
   the image processing device adjusts a space between corresponding object points in left and right eye images in the 3D video signal in accordance with the position information and using a computing formula:

$$M = \frac{SL}{D-L},$$

such that a depth of field remains unchanged, and transmits a adjusted 3D video signal to the 3D video signal output device,
   wherein M is a space between the corresponding object points of the left and right images shown on the display screen, S is a pupil distance of the viewer, D is a distance between the viewer and the display screen, and L is the depth of field.

2. The depth of field maintaining apparatus according to claim 1, wherein the image processing device comprises:
   a left and right eye image adjustment module, adjusting the space between the corresponding object points in the left and right eye images of the 3D video signal in accordance with the position information so as to keep the depth of field unchanged for the same viewer, and transmits adjusted left and right eye images to a 3D video signal generating module; and
   the 3D video signal generating module, generating a new 3D video signal in accordance with the adjusted left and right eye images and transmits the new 3D video signal to the 3D video signal output device.

3. The depth of field maintaining apparatus according to claim 2, wherein the image processing device further comprises:
   a left and right eye image extracting module, which receives the 3D video signal and sends the left and right eye images extracted from the 3D video signal to the left and right eye image adjustment module.

4. The depth of field maintaining apparatus according to claim 3, wherein the left and right eye image extracting module comprises:
   a sampling sub-module, capturing one frame data of the 3D video signal and sending the one frame data to a separating sub-module; and
   the separating sub-module, transmitting the left and right eye images separated from the one frame data to the left and right eye image adjustment module.

5. The depth of field maintaining apparatus according to claim 1, further comprises:
   a depth of field acquisition device and a depth of field memory, wherein the depth of field acquisition device is connected to the position measuring device, the image processing device and the depth of field memory, and the depth of field memory is connected to the image processing device, and
   the depth of field acquisition device receives an original position information of the viewer detected by the position measuring device and receives an original space between the corresponding object points in the left and right eye images in the 3D video signal sent by the image processing device, and calculates the depth of field and sends the depth of field to the depth of field memory to store.

6. The depth of field maintaining apparatus according to claim 1, further comprises a depth of field acquisition device and a depth of field memory,
   wherein the depth of field acquisition device is connected to the depth of field memory, and sends a received original depth of field value to the depth of field memory, and the depth of field memory is connected to the image processing device.

7. The depth of field maintaining apparatus according to claim 1, further comprises a depth of field acquisition device and a depth of field memory,
   wherein the depth of field acquisition device is connected to the position measuring device, the 3D video signal input device and the depth of field memory, and the depth of field memory is connected to the image processing device, and
   the depth of field acquisition device receives an original position information of the viewer detected by the position measuring device and receives an original space between the corresponding object points in the left and right eye images in the 3D video signal sent by the 3D video signal input device, and calculates the depth of field and sends the depth of field to the depth of field memory to store.

8. The depth of field maintaining apparatus according to claim 1, wherein the position measuring device comprises a camera, an infrared sensor or a device by which a position information is manually inputted.

9. A 3D display system, comprising:
   a display device; and
   a depth of field maintaining apparatus according to claim 1, the 3D video signal output device of the depth of field maintaining apparatus is connected to the display device and transmits an adjusted 3D video signal to the display device for displaying.

10. The 3D display system according to claim 9, wherein the display device comprises a Shutter Glasses 3D display device, a phase retarder 3D display device, a parallax barrier 3D display device, a lenticular grating 3D display device or a directional backlight 3D display device.

11. A 3D display method performed by using the depth of field maintaining apparatus according to claim 1, comprising:
   step S1, capturing in real time position information of a viewer and a display screen with changing of a position of the viewer and acquiring left and right eye images of a 3D video signal;
   step S2, calculating a space between corresponding object points of the left and right eye images displayed on the display screen in real time in accordance with the position information, such that the depth of field remains unchanged for the same viewer;
   step S3, generating a new 3D video signal in accordance with a calculated space in the step S2 and the left and right eye images, and making it be displayed on the display screen,
   wherein a computing formula in the step S2 is as following:

$$M = \frac{SL}{D-L}$$

wherein M is a space between the corresponding object points of the left and right images shown on the display screen, S is a pupil distance of the viewer, D is a distance between the viewer and the display screen, and L is the depth of field.

12. The 3D display method according to claim 11, wherein in the step S1, the position information of the viewer and the display screen is captured by using a camera, an infrared sensor or a device by which the position information is manually inputted.

13. The 3D display method according to claim 11, wherein if the left and right eye images of the 3D video signal are transmitted in the form of one integrally picture, the acquiring left and right eye images of a 3D video signal in the step S1 comprises the following steps:
   capturing one frame data of the 3D video signal;
   separating the left and right eye images from the one frame data.

14. The 3D display method according to claim 11, before the step S1, further comprising:
   calculating the depth of field according to an original space between the corresponding object points when the left and right eye images is displayed on the display screen and an original distance between the viewer and the display screen by using the following formula:

$$L = \frac{MD}{S+M}$$

wherein M is a space between the corresponding object points of the left and right images shown on the display screen, S is a pupil distance of the viewer, D is a distance between the viewer and the display screen, and L is the depth of field.

15. The 3D display method according to claim 11, before the step S1, further comprising: acquiring an original depth of field value set by the user.

* * * * *